United States Patent [19]

Boelter

[11] 4,286,006
[45] Aug. 25, 1981

[54] CORRUGATED MATERIAL

[75] Inventor: Lester B. Boelter, Edina, Minn.

[73] Assignee: Boelter Industries, Inc., Winona, Minn.

[21] Appl. No.: 762,410

[22] Filed: Jan. 26, 1977

[51] Int. Cl.$^3$ .................. B32B 3/28; B32B 29/00
[52] U.S. Cl. .................. 428/182; 428/186; 428/212; 428/332; 428/481; 428/507; 428/913
[58] Field of Search ............ 428/182, 184, 186, 116, 428/119, 530, 913, 212, 332, 481, 507; 156/205, 210; 264/286; 224/6 R, 90

[56] References Cited

U.S. PATENT DOCUMENTS

| 1,605,953 | 11/1926 | Howard | 428/186 |
| 2,027,586 | 1/1936 | George | 428/182 |
| 2,148,176 | 2/1939 | Schroeder | 428/186 |
| 3,697,365 | 10/1972 | Reisman et al. | |
| 3,796,304 | 3/1974 | McKinney | 428/182 |
| 3,936,339 | 2/1976 | Lock et al. | 428/530 |

Primary Examiner—Paul J. Thibodeau
Attorney, Agent, or Firm—Merchant, Gould, Smith, Edell, Welter & Schmidt

[57] ABSTRACT

A corrugated material suitable for packaging applications is disclosed, in which a sheet of very flexible material having a high resistance to tearing and stretching is bonded to the flutes of a sheet of single faced corrugated board, resulting in a structure which is rollable in the direction of the flexible substrate, and which is substantially rigid when a force is applied to roll it towards the facing of the single faced corrugated board.

12 Claims, 7 Drawing Figures

CORRUGATED MATERIAL

BACKGROUND OF THE INVENTION

1. Field of the Invention

This invention relates generally to the field of corrugated materials, and more particularly concerns the field of corrugated materials suitable for packaging applications.

2. Description of the Prior Art

Corrugated packaging materials are well known. One common corrugated material is known as "single faced corrugated board". Single faced corrugated fiber board is made by gluing a flat sheet of liner board to a sheet of corrugating material, known as a medium, which has been passed through a "single facer" and formed into a series of arches, or flutes. Although it is resistive to compressive forces exerted longitudinally of the flutes and to forces which would bow the flutes, single faced corrugated board may be flexed in two directions without structural damage, and may be rolled into cylindrical rolls, wherein the flutes run parallel to the longitudinal axis of the cylinder, with either the facing or the corrugating medium on the outside of the roll. Generally, single faced corrugated board is rolled with the corrugating medium to the inside. Single faced corrugated board is typically used as a packaging and cushioning material in which products may be wrapped.

A second common corrugated material is known as "double faced corrugated board". Double faced corrugated fiber board is made by gluing one flat sheet of liner board to each side of the corrugated medium. The fluted construction gives strength and rigidity to the fiber board and serves as a cushion for anything which comes in contact with it. More than 90% of all corrugated boxes are manufactured from double faced corrugated board. It is also used in the form of liners, pads, shelves, and partitions for the inner packing of glassware and other fragile articles which require protection, as well as a multitude of other applications.

Double faced corrugated board is substantially rigid in all directions, and may not be rolled without "breaking" one or both faces. Breaking occurs when the board from which one of the faces is constructed permanently buckles, or creases, between the spans of the flutes in the corrugated medium. Once a face has been broken, the double faced corrugated board loses its planar rigidity.

Since double faced corrugated board may not be rolled for storage and shipping without destroying its structural properties, it must be shipped in flat sheets, which are more difficult to handle than rolls.

Single faced corrugated and double faced corrugated board are generally constructed of fiber board. The facings and the corrugated mediums are glued together with a starch base or comparable glue. Occasionally, fiber board is coated or impregnated with wax or plastic to create a waterproof board. More recently, single faced and double faced corrugated board have been constructed from plastic and appropriate adhesives. Such a board is the "TRU-COR" ™ plastic corrugated board produced by the Menasha Corporation. Another recent development is a fluted, double faced sheet that is extruded from a thermoplastic, which resembles double faced corrugated fiber board. An example of this product is "PRIME COR-X" ® sheet, produced by the Primex Corporation of Oakland, N.J. These materials have properties similar to corrugated fiber boards, in that single faced corrugated plastic board is rollable, and has good cushioning properties, and double faced corrugated plastic board, or double face extruded plastic board is substantially rigid in all directions, and is not rollable without "breaking" one or both faces of the board.

SUMMARY OF THE INVENTION

Until the present invention, a corrugated material incorporating the strength and durability of double faced corrugated board, including its rigidity or reluctance to deflect in response to forces directed normally at the faces, with the advantages embodied in single faced corrugated board, including the feature that it may be stored in large rolls which are easy to store and handle, has not been known.

In accordance with the present invention, a sheet of single faced corrugated board is combined with a second facing of material having a high tear strength and resistance to stretching, but having a very small capacity for withstanding compressive forces exerted across spans between the flutes in the corrugating medium, when compared with the capacity of the material of the first facing for withstanding such forces. The flexible, second facing, or substrate, is affixed to the flutes of a single faced corrugated board just as the second facing is affixed to a single faced corrugated sheet to create a double faced corrugated board.

There is a major difference, however, between the corrugated board of the present invention and conventional double faced corrugated board. In conventional double faced board, the fluted medium is sandwiched between two members, each of which is capable of transmitting tension and compression forces up to a certain limit. In the present invention, the fluted medium is sandwiched between a first member capable of transmitting both tension and compression forces and a second member essentially capable of transmitting tension forces only. This configuration gives the corrugated sheet of the present invention strength in one direction and flexibility in another direction. Any bowing forces exerted on a sheet of the material tending to bow the sheet toward the conventional first facing side will be resisted by a combination of tension forces transmitted across the flexible facing and compression forces transmitted across the conventional facing, thus preventing the sheet from being substantially deformed until such time as the conventional first facing breaks. On the other hand, bowing forces exerted to bow the sheet towards the flexible facing side of the sheet will not be resisted because of the flexible facing's inability to transmit compressive forces across the flute spans. The flexible facing buckles between the flutes when such bowing forces are exerted, and the sheet may be deformed in response to such forces without breaking either facing.

The corrugated material of the present invention retains strength against compressive forces exerted longitudinally over the flutes, just as conventional single faced and double faced corrugated boards do. In addition, the corrugated board of the present invention may be scored across the flutes and bent along the score lines to create a variety of rigid structures, in the same manner as conventional single faced and double faced corrugated board.

A wide variety of flexible substrates may be used in accordance with the present invention, and thus a number of different effects may be achieved. For instance, a flexible plastic substrate having non-stick and heat resistant characteristics may be used to produce containers for frozen and carry-out foods, such as pizza carrying circles to which pizza crust would not stick, or grease penetrate, which are common problems with conventional double faced corrugated fiber board pizza circles.

Such flexible plastic substrates also produce water proof structures or temporary liquid containers, depending upon the orientation of the board.

If the flexible substrate is given a reflective surface, the corrugated material can be used in the construction of light-gathering structures, such as sun bathing boxes, sun shelters in desert climates, or ice fishing huts in cold climates.

Such material can also be used in the construction of scuff resistant packaging, and temporary furniture such as folding file cabinets.

The present invention also has wide application in the decorative packaging area. A flexible substrate such as ordinary paper, or plastic film which has been colored, embossed, laminated, etched, or otherwise decorated can be used to produce a large variety of ornamental packages and displays.

Another useful effect is achieved when the flexible substrate used is a plastic film having its face coated with a cohesive adhesive. Such adhesives are characterised in that they essentially stick to themselves, but not to other materials. Thus, corrugated material having such a facing can be rolled up and unrolled easily—since a layer of fiber board is always interposed between cohesive surfaces. The material may be rolled out and cut into sheets, and the sheets can be placed cohesive face-to-cohesive face to produce a double wall corrugated board which can be used to build temporary structures, or in heavy packaging applications.

The foregoing are only some of the many applications to which the corrugated board of the present invention may be placed. Other features and uses will become apparent upon reviewing the drawings and reading the detailed description of the preferred embodiment.

It will be appreciated that the structure of the present invention results in an improved corrugated board having strength in a direction heretofore only enjoyed by conventional double faced corrugated board, while at the same time having the capacity to be rolled for storage and shipping, in a manner similar to the way in which conventional single faced corrugated board is rolled for storage, shipping, and handling.

DESCRIPTION OF THE PREFERRED EMBODIMENT

Figure 1:
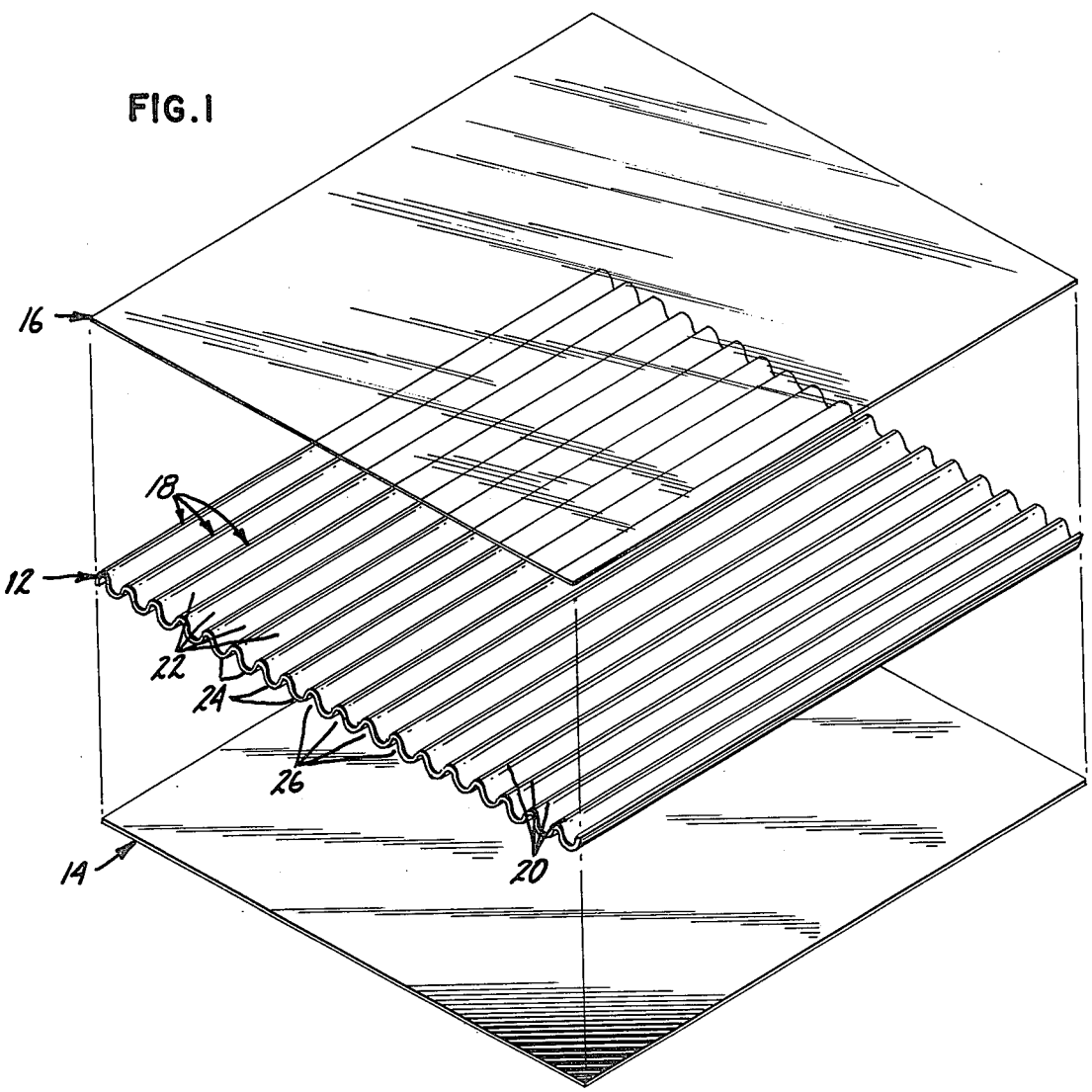
FIG. 1 is an exploded perspective view of a portion of a sheet of corrugated material made in accordance with the present invention.

Turning first to FIG. 1, there is shown a piece of corrugated material constructed in accordance with the present invention. Following the preferred procedure, a sheet of corrugated medium 12 is sandwiched between a sheet of first facing material 14 and a sheet of second, flexible facing material 16.

The sheet of corrugating medium 12 is provided with a plurality of arches, or flutes 18 which extend in parallel fashion from edge to edge of sheet 12. Flutes 18 provide corrugating medium 12 with a plurality of upper presented surfaces 20, alternating with a plurality of upper spans 22, and a plurality of lower presented surfaces 24 alternating with a plurality of lower spans 26. This configuration is more clearly shown in FIG. 2. Preferably, the corrugated medium 12 is made of heavyduty fiber board, such as 26 pound semi-chem. It will be appreciated that various flute sizes may be used, including the standard flute sizes E, C, B, A, and AA, depending upon the application.

First facing 14 is a planar sheet of material having a flexibility, or stiffness as measured by the Corrugated Linerboard Test (CLT), normally accepted in the industry for use in single faced and double faced corrugated board applications. Preferably, first facing 14 is made of kraft liner board, and may be used in a variety of strengths. Typically, a 42 pound kraft liner board is used.

Corrugated medium 12 is glued to first facing 14. Typically, a starch base glue will be applied to lower presented surfaces 24, and first facing 14 will be pressed thereon. In this manner, first facing 14 is affixed to corrugating medium 12 along each lower presented surface 24. Thus, flutes 18 are prevented from distorting or flattening out. While it is contemplated that both corrugating medium 12 and first facing 14 will be constructed of fiber board, and bonded to one another with a starch glue, it is possible that both corrugating medium 12 and first facing 14 might be made of a thermoplastic and bonded to one another with an appropriate adhesive, or heat sealed to one another.

After performing the above described operations, a piece of conventional single faced corrugated board will have been produced. A piece of conventional double faced corrugated board could then be produced by affixing a second facing identical to first facing 14 to the upper presented surfaces 20 of corrugating medium 12. Such a step is not, however, contemplated in the present invention. Rather, the second facing 16 has markedly different characteristics than first facing 14.

The second facing should be made of a material having a high resistance to stretching or tearing due to tensile forces exerted thereon, being, for example, equal to or greater than that of the material from which the first facing is made, but which has little, if any, capacity to withstand or transmit any compressive forces exerted across spanning lengths of the material. Thus, the facing 16 is substantially non-extensible in the direction transverse to flutes 18. It should be noted, however, that in some applications, the tensile strength of the flexible facings need not be as great as that of the first facing. For instance, low density polyethylene might be used as the flexible facing in some packaging situations. The capacity to transmit compressive forces, which might also be called flexibility may be measured on a Gurley stiffness tester, known in the industry. The higher the stiffness, the less flexible the material, and the greater its ability to transmit compressive forces. In the present invention, the material of the flexible substrate should be such that it will temporarily buckle in response to any compressive force exerted thereon. The preferred range of flexibility, as measured on a Gurley stiffness tester, and based on miligrams per inch of width, is 1.50 to 125.00. The preferred material is a stretch oriented polyester film, polyethylene terephthalate, in a caliper range of one to two mils.

In the preferred embodiment, this polyester sheet is adhesively bonded to the corrugated medium 12 along each upper presented surface 20. An appropriate adhesive for this use would be a resin emulsion such as the one made by the H. B. Fuller Company and designated by the number 7-309-502, although other adhesives would also be appropriate.

In other embodiments, the flexible facing and corrugated medium may be heat sealed to one another, rather than adhesively bonded. For example, another very versatile material suitable for use as a flexible facing is high density polyethylene in a caliper range of ½ to 4 mils, which can be adhesively bonded or heat sealed to the fluted medium.

Figure 2:
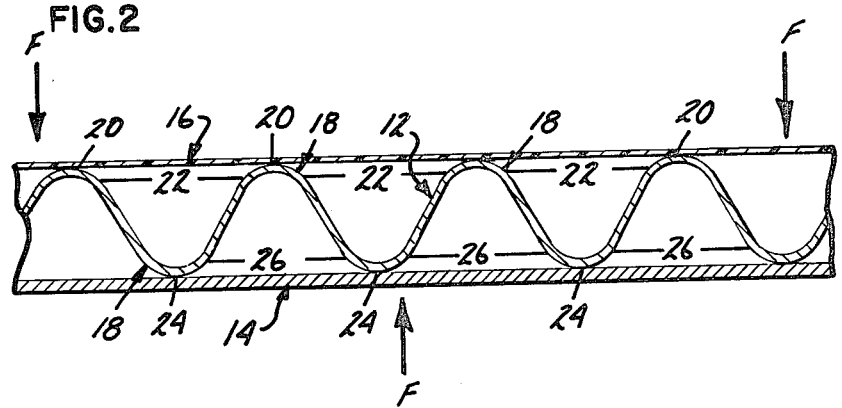
FIG. 2 is an enlarged side elevation of a portion of the corrugated material shown in FIG. 1.
Figure 3:
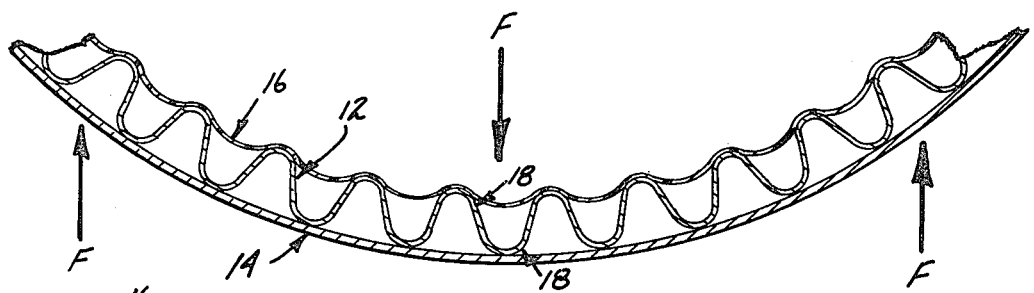
FIG. 3 is an enlarged side elevational view showing a portion of a sheet of the corrugated material made in accordance with the present invention in a rolled, or flexed, state.

The reaction of a corrugated board constructed as described to certain bowing forces is illustrated in FIGS. 2 and 3. Arrows F in FIG. 2 indicate a loading which would tend to bow a sheet of material toward conventional facing 14. These forces would pull flexible facing 16 taut across upper surfaces 20 and upper spans 22, and would tend to compress lower facing 14 across lower spans 26 between lower presented surfaces 24. Since flexible facing 16 resists stretching or tearing due to the tensile forces exerted thereon, and lower facing 14 will transmit compressive forces across spans 26, the corrugated material will remain rigid, as shown in FIG. 2, until the loading creates compressive forces in lower facing 14 of sufficient magnitude to plastically buckle, or crease lower facing 14 between one or more of lower presented surfaces 24. When such permanent buckling has occurred, the corrugated material has lost its rigidity.

When the loading is as shown in FIG. 3, the tendency is to bow the corrugated material towards flexible facing 16. Since the material from which flexible facing 16 is constructed will not transmit compressive forces across upper spans 42, the corrugated board will deflect towards flexible facing 16. When this occurs, flexible facing 16 temporarily buckles, i.e. does not crease, between upper presented surfaces 20, and generally follows the contours of corrugated medium 12. This temporary buckling does not destroy the tensile strength of flexible substrate 16, and thus the corrugated material may be flexed in the direction shown in FIG. 3, without destroying its ability to withstand a loading of forces such as shown in FIG. 2.

The manufacture of the corrugated material of the present invention is similar to that already known in the industry for single faced and double faced corrugated board. Briefly, single faced corrugated board is stripped from a roll, run through a series of tension rollers, and passed through a glue station wherein the appropriate adhesive is applied to upper presented surfaces 20. At the same time, the polyester film is stripped from a roll of the film, run past a series of tension rollers, and brought into contact with the upper presented surfaces of the corrugating medium after the corrugating medium has passed through the gluing station. The combined sheet is then passed through a series of nip and laminating rollers, whereby the film is firmly pressed onto the single faced sheet. The combined sheet then passes to a rewind station where it is rolled, flexible film side in. A jet of air is utilized at the rewind station to initially blow the film downwardly between upper presented surfaces 20, as the combined corrugated material is being rewound into large rolls.

Figure 4:
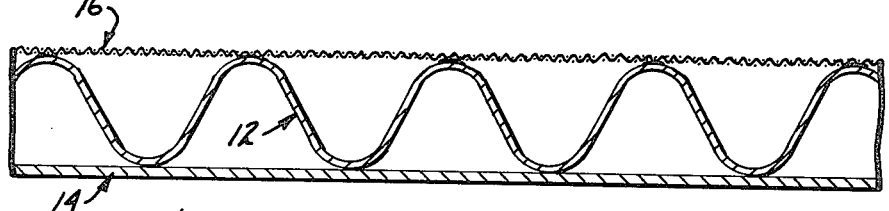
FIG. 4 is a view similar to that of FIG. 2, showing a conventional sheet of single faced corrugated board in combination with a flexible facing made of nonwoven, plasticized paper.
Figure 5:
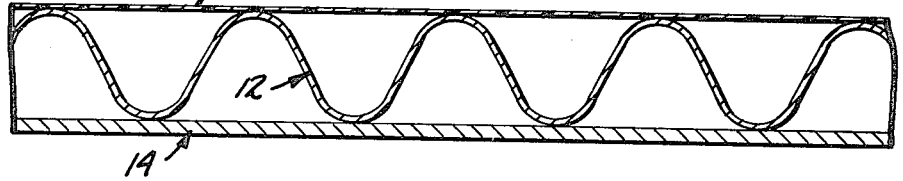
FIG. 5 is a view similar to that of FIG. 2, showing a conventional single faced corrugated board in combination with a flexible facing made of high density polyethylene.
Figure 6:
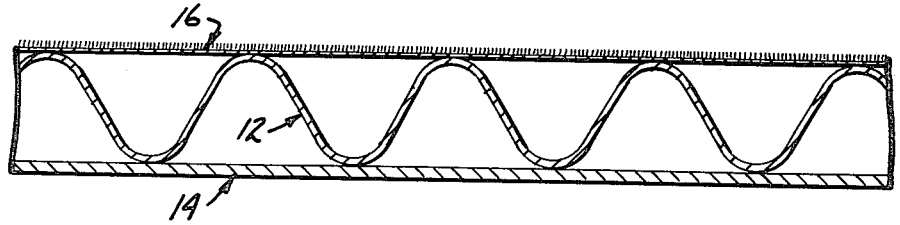
FIG. 6 is a view similar to that of FIG. 2 showing a conventional single faced corrugated board in combination with a flexible facing made of paperbacked velour.
Figure 7:
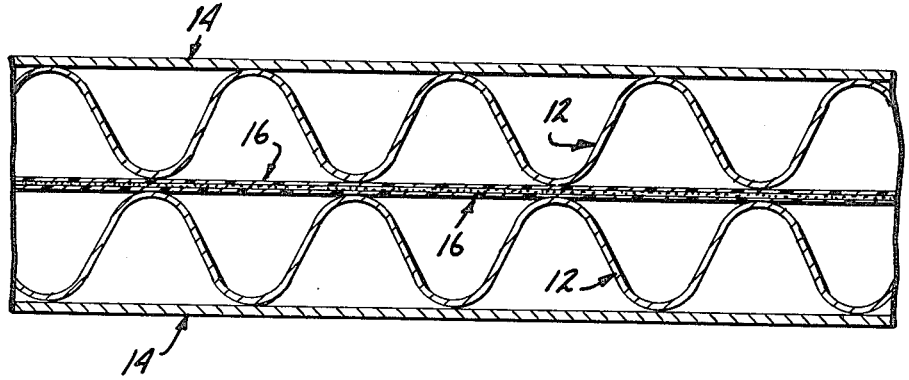
FIG. 7 is an enlarged side elevation view showing two pieces of corrugated material made in accordance with the present invention, wherein the flexible facing has a cohesive adhesive coating, and wherein the sheets are placed flexible face-to-flexible face to create a double wall sheet.

FIGS. 4, 5, 6 and 7 show various embodiments of the present invention, wherein different materials have been used to make flexible substrate 16. In FIG. 4, an embossed, plasticized, non-woven paper has been used. In FIG. 5, a high density polyethylene has been used. In FIG. 6, an ornamental paperbacked velour has been used. FIG. 7 shows a double wall corrugated structure utilizing two sheets of corrugated material made in accordance with the present invention, placed flexible face-to-flexible face. In this case, the flexible substrate 16 is a plastic coated with a cohesive adhesive coating.

Since there are so many possible combinations of facing strengths and materials, corrugating medium strengths, materials, and flute sizes, and adhesives, it would not be feasible to enumerate the precise make-up of material for each use, but as an example, pizza circles may be constructed of 33 pound bleached white liner glued with a starch adhesive to 33 pound bleached white medium having B flutes. These can then be combined with a 1.5 mil polyester film, which is bonded thereto with Fuller's number 7-309-502 adhesive. Various packaging containers, inserts, mailers, pads, and dividers, can be made from a 42 pound kraft liner starch glued to a 26 pound semi-chem B flute medium, combined with a polyester film in the range of 0.5 to 3.0 mils. Other decorative and scuff resistant packaging containers can be made from 42 pound kraft liner starch glued to 26 pound, B flute medium, and 2 mil high density polyethylene film heat sealed to the medium.

These examples are only a few of the many possible combinations of materials within the spirit of this invention.

What is claimed is:

1. A corrugated packaging material comprising, in combination:
    (a) a layer of single faced corrugated board including
        (i) a fluted medium having a plurality of upper presented surfaces alternating with a plurality of upper spans, and a plurality of lower presented surfaces alternating with a plurality of lower spans, said alternating presented surfaces and spans defining a plurality of flutes extending parallel to each other, and
        (ii) a first facing affixed to said medium along each lower presented surface; and
    (b) a second facing affixed to said medium along each upper presented surface, said second facing being substantially non-extensible in a direction transverse to the direction in which said flutes run; wherein (c) said first facing has a much greater ability to transmit compressive forces across a spanning length thereof without buckling than said second facing.

2. The corrugated packaging material of claim 1 wherein the second facing sheet is made of a waterproof material.

3. The corrugated packaging material of claim 2 wherein the flexibility characteristics of the first and second facing materials are such that a compressive force which, when exerted across one spanning length of the first facing, causes permanent buckling thereof, causes temporary buckling of the second facing when exerted across one spanning length of the second facing.

4. The corrugated packaging material of claim 1 wherein the second facing is a cohesive coated film.

5. The packaging material of claim 1 wherein said first facing material is liner board.

6. The packaging material of claim 5 wherein said second facing material is stretch oriented polyester film.

7. In a double faced corrugated fiber board comprising a kraft paper fluted medium sandwiched between kraft paper first and second facings of substantially the same stiffness, which structure is substantially rigid in all directions until broken, the improvement comprising the elimination of the second kraft paper facing, and its replacement with a flexible facing made of a stretch oriented polyester film, whereby an improved corrugated board is constructed which resists, until broken, forces tending to flex the board about a first axis running transverse to the direction in which the flutes run, and a second axis running parallel to the direction in which the flutes run, but which will flex without breaking in response to forces tending to flex the board towards the flexible replacement facing around the second axis.

8. The improved corrugated board of claim 7 wherein the replacement facing is made from ½ to 4 mil high density polyethylene.

9. A corrugated packaging material comprising, in combination:
(a) a layer of single faced corrugated board including
 (i) a fluted medium having a plurality of upper presented surfaces alternating with a plurality of upper spans, and a plurality of lower presented surfaces alternating with a plurality of lower spans, said alternating presented surfaces and spans defining a plurality of flutes extending parallel to each other, and
 (ii) a first facing affixed to said medium along each lower presented surface; and
(b) a second facing affixed to said medium along each upper presented surface, said second facing being substantially non-extensible in a direction transverse to the direction in which said flutes run; wherein
(c) said first facing has a much greater ability to transmit compressive forces across a spanning length thereof without buckling than said second facing; wherein
(d) said first facing material is liner board; and wherein
(e) said second facing material is stretch oriented polyester film.

10. A corrugated packaging material comprising, in combination:
(a) a layer of single faced corrugated board including
 (i) a fluted medium having a plurality of upper presented surfaces alternating with a plurality of upper spans, and a plurality of lower presented surfaces alternating with a plurality of lower spans, said alternating presented surfaces and spans defining a plurality of flutes extending parallel to each other, and
 (ii) a first facing affixed to said medium along each lower presented surface; and
(b) a second facing affixed to said medium along each upper presented surface, said second facing being substantially non-extensible in a direction transverse to the direction in which said flutes run; wherein
(c) said first facing has a much greater ability to transmit compressive forces across a spanning length thereof without buckling than said second facing; wherein
(d) the second facing sheet is made of a waterproof material; wherein
(e) the flexibility characteristics of the first and second facing materials are such that a compressive force which, when exerted across one spanning length of the first facing causes permanent buckling thereof, causes temporary buckling of the second facing when exerted across one spanning length of the second facing; and wherein
(f) the second facing is made of a stretch oriented polyester film.

11. The corrugated packaging material of claim 10 wherein the stretch oriented polyester film is polyethylene terephthalate.

12. A corrugated packaging material comprising, in combination:
(a) a layer of single faced corrugated board including
 (i) a fluted medium having a plurality of upper presented surfaces alternating with a plurality of upper spans, and a plurality of lower presented surfaces alternating with a plurality of lower spans, said alternating presented surfaces and spans defining a plurality of flutes extending parallel to each other, and
 (ii) a first facing affixed to said medium along each lower presented surface; and
(b) a second facing affixed to said medium along each upper presented surface, said second facing being substantially non-extensible in a direction transverse to the direction in which said flutes run; wherein
(c) said first facing has a much greater ability to transmit compressive forces across a spanning length thereof without buckling than said second facing; wherein
(d) the second facing sheet is made of a waterproof material; wherein
(e) the flexibility characteristics of the first and second facing materials are such that a compressive force which, when exerted across one spanning length of the first facing, causes permanent buckling thereof, causes temporary buckling of the second facing when exerted across one spanning length of the second facing; wherein
(f) the second facing is made of a high density polyethylene film.

* * * * *